United States Patent
Tanabe et al.

(10) Patent No.: US 10,814,755 B2
(45) Date of Patent: Oct. 27, 2020

(54) VEHICLE SEAT

(71) Applicant: TS TECH CO., LTD., Asaka-shi, Saitama (JP)

(72) Inventors: Jinichi Tanabe, Tochigi (JP); Akimitsu Kurihara, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 168 days.

(21) Appl. No.: 15/893,957

(22) Filed: Feb. 12, 2018

(65) Prior Publication Data

US 2018/0162248 A1     Jun. 14, 2018

Related U.S. Application Data

(62) Division of application No. 15/120,623, filed as application No. PCT/JP2015/055697 on Feb. 26, 2015, now Pat. No. 9,889,780.

(30) Foreign Application Priority Data

Feb. 28, 2014   (JP) .................. 2014-039334

(51) Int. Cl.
*B60N 2/68* (2006.01)
*B60R 21/207* (2006.01)
(Continued)

(52) U.S. Cl.
CPC ............. *B60N 2/68* (2013.01); *B60N 2/4235* (2013.01); *B60N 2/4256* (2013.01); *B60N 2/986* (2018.02); *B60R 21/207* (2013.01)

(58) Field of Classification Search
CPC ............ B60R 22/1952; B60R 22/1954; B60R 22/1955; B60R 22/1956; B60R 22/4619
See application file for complete search history.

(56) References Cited

U.S. PATENT DOCUMENTS

| | | |
|---|---|---|
| 4,787,756 A | 11/1988 | Pilarski |
| 5,997,032 A | 12/1999 | Miwa et al. |

(Continued)

FOREIGN PATENT DOCUMENTS

| | | |
|---|---|---|
| DE | 37 14588 A1 | 11/1988 |
| DE | 10 2008 060 486 A1 | 6/2010 |

(Continued)

OTHER PUBLICATIONS

Cott et al. Support frame for integration into backrest of motor vehicle seat, has support part for reinforcing side part, which is projected in seat direction, of backrest, and fastened to side bars in form-fit and/or force-fit manner, Jun. 10, 2010, DE 10 2008 060 486 A1, English Abstract (Year: 2010).*

(Continued)

*Primary Examiner* — James A English
(74) *Attorney, Agent, or Firm* — Faegre Drinker Biddle & Reath LLP

(57) ABSTRACT

A vehicle seat that can suitably protect a seated occupant against an impact from a seat width direction is described, while enlargement of the seat in the seat width direction is restrained. A support member provided to the vehicle seat supports the seated occupant from a side of the seated occupant, and includes an inner plate attached to a seat width direction inner side of a side frame, an outer plate attached to a seat width direction outer side of the side frame, and a connection plate for connecting the inner plate and the outer plate on a seat front side. The outer plate is attached to the seat width direction outer side of the side frame at a position that does not overlap in the seat width direction with attachment positions of the inner plate and the side frame.

18 Claims, 12 Drawing Sheets

(51) Int. Cl.
    *B60N 2/42*    (2006.01)
    *B60N 2/90*    (2018.01)

(56) References Cited

U.S. PATENT DOCUMENTS

| | | |
|---|---|---|
| 9,199,558 B1 | 12/2015 | Jovicevic |
| 2013/0257131 A1 | 10/2013 | Nishiura et al. |
| 2014/0049090 A1 | 2/2014 | Mori et al. |
| 2014/0070594 A1 | 3/2014 | Awata et al. |
| 2014/0225352 A1* | 8/2014 | Awata ................. B60R 21/207 280/728.2 |
| 2014/0375106 A1 | 12/2014 | Yamada et al. |
| 2015/0145313 A1 | 5/2015 | Lee et al. |
| 2017/0240082 A1 | 8/2017 | Yokoyama |

FOREIGN PATENT DOCUMENTS

| | | | |
|---|---|---|---|
| DE | 102008060486 A1 * | 6/2010 | ............... B60N 2/68 |
| FR | 2 453 619 A | 11/1980 | |
| JP | S63-153858 U | 10/1988 | |
| JP | H02-111346 U | 9/1990 | |
| JP | H08-132943 A | 5/1996 | |
| JP | H10-250522 A | 9/1998 | |
| JP | 3519644 B2 | 4/2004 | |
| JP | 2009-095597 A | 5/2009 | |
| JP | 2009143260 A * | 7/2009 | |
| JP | 2011-006003 A | 1/2011 | |
| WO | 2012/157099 A1 | 11/2012 | |

OTHER PUBLICATIONS

Cott et al. Support frame for integration into backrest of motor vehicle seat, has support part for reinforcing side part, which is projected in seat direction, of backrest, and fastened to side bars in form-fit and/or force-fit manner, Jun. 10, 2010, DE 102008060486A1, Machine Translation of Description (Year: 2010).*

Kamagi et al., Seat for Vehicle with Built-In Side Airbag Device, Jul. 2, 2009, EPO, JP 2009-143260 A, English Abstract (Year: 2009).*

Kamagi et al., Seat for Vehicle with Built-In Side Airbag Device, Jul. 2, 2009, EPO, JP 2009-143260 A, Machine Translation of Description (Year: 2009).*

Office Action issued in related application JP 2018-108911, dated Jun. 4, 2019, with machine generated English language translation, 4 pages.

Extended European Search Report issued for corresponding application EP 15755237.3, dated Feb. 8, 2017, 7 pages.

Office Action issued in related application CN 201710888663.5, dated Oct. 18, 2019, with partial English language translation, 10 pages.

Office Action issued in related application CN 201710888695.5, Sep. 4, 2019, with partial English language translation, 7 pages.

* cited by examiner

FRONT ⟵⟶ BACK

FRONT ⟷ BACK

VEHICLE SEAT

CROSS REFERENCE TO RELATED APPLICATIONS

This application is a divisional of U.S. patent application Ser. No. 15/120,623, filed Aug. 22, 2016, now U.S. Pat. No. 9,889,780, which is a National Stage Entry application of PCT Application No. PCT/JP2015/055697, filed Feb. 26, 2015, which claims the priority benefit of Japanese Patent Application No. 2014-039334, filed Feb. 28, 2014, the contents being incorporated herein by reference.

BACKGROUND

The present disclosure relates to a vehicle seat, and particularly to a vehicle seat including a support member that is attached to a side frame of a seat back frame and supports a seated occupant from a side of the seated occupant.

As a technique for protecting a seated occupant against a sideways impact of a vehicle, vehicles including a door-mounted airbag in which an airbag module is disposed on a side of a seat, for example, in the interior of a side door, are conventionally known.

Moreover, similarly, as a technique aimed at impact reduction during a side collision, and further for suitably supporting a seated occupant from the occupant's side during normal operation, Japanese Patent Publication JP 2009-095597 discloses a technique to provide a side portion of a seat back frame with a side support internally including a cavity for impact reduction and providing flexibility. Specifically, according to Japanese Patent Publication JP 2009-095597, a seated occupant is horizontally moved during a side collision and presses against the side support so that the cavity of the side support is crushed, which allows the seated occupant to horizontally move, whereby impact can be absorbed.

As in the disclosure of Japanese Patent Publication JP 2009-095597, in a case in which the cavity in the side support reduces sideways impact from a seat while the seated occupant can be supported on the occupant's side during normal operation as well, providing a cavity that is sufficiently large for impact absorption is required. Accordingly, an amount of protrusion of the side support toward a seat sideward space becomes necessarily large, which results in reducing an interior space of the vehicle.

SUMMARY

The present disclosure has been made in view of the problem as described above, and an embodiment of the present disclosure provides a vehicle seat that can suitably protect a seated occupant against an impact from a seat width direction while enlargement of the seat in the seat width direction is restrained. Moreover, an embodiment of the present disclosure provides a vehicle seat that has high support rigidity against a load applied from the seated occupant during normal operation and can suitably support the seated occupant. Further, an embodiment of the present disclosure provides a vehicle seat that can suitably support the seated occupant by reducing a load applied to a seated occupant during a side collision.

The problem as described above is solved by a vehicle seat according to an embodiment of the present disclosure, including: a support member attached to a side frame of a seat back frame and supporting a seated occupant from a side of the seated occupant, in which the support member includes an inner plate attached to an inner side of the side frame in a seat width direction, an outer plate attached to an outer side of the side frame in the seat width direction, and a connection portion that connects a front side of the inner plate and a front side of the outer plate in a seat front to back direction, and the outer plate is attached to the seat width direction outer side of the side frame at a position that does not overlap in the seat width direction with a position of attaching the inner plate to the side frame.

In the configuration as described above, the outer plate of the support member is attached to the side frame at a position that does not overlap in the seat width direction with a position of attaching the inner plate to the side frame, whereby a rigidity against a load applied to the support member in the seat width direction can be reduced. The support member regulates movement of the seated occupant in the seat width direction when a vehicle is in a normal state and can allow the seated occupant to move in the seat width direction when, in a case in which the vehicle has a side collision, a larger load than the normal state is applied from the seated occupant in the seat width direction, whereby application of a reaction force from the support member to the seated occupant can be restrained. Accordingly, proper protection of the seated occupant from the seat width direction during normal operation or a side collision can be achieved using the vehicle seat including the support member attached to the seat width direction inner and outer sides of the side frame by the inner plate and the outer plate to be disposed, the vehicle seat being more compact than one that is disposed only to an outer side of the side frame.

Further, suitably, the support member includes a rear side connection portion connected to the inner plate, the outer plate, and the connection portion at a side of the side frame of the connection portion, and the rear side connection portion is formed in such a manner as to abut against a front surface of the side frame when a load is applied to the inner plate. In the configuration as described above, the rear side connection portion abutting against the side frame is provided to the support member, whereby a support rigidity of the support member against a load applied from the seated occupant through the support member to the side frame can be improved and the seated occupant can be suitably supported.

Moreover, preferably, the inner plate is attached to the side frame in such a manner as to be positioned at a height of a chest region of the seated occupant. In the configuration as described above, the inner plate positioned on a side in contact with the seated occupant is positioned at the height of the chest region of the seated occupant, whereby sides of the chest region of the seated occupant that require protection during a side collision can be suitably supported.

Moreover, preferably, the side frame includes a front expansion portion that expands to a seat front at a portion corresponding to at least a height of the waist of the seated occupant, and the inner plate is provided above a maximum expansion position of the front expansion portion. In the configuration as described above, interference of deformation of the inner plate due to pressing from the seated occupant with the front expansion portion can be suppressed, deformation of the support member toward a seat width direction outer side can be secured, and a load applied to the seated occupant during a side collision is reduced, whereby the seated occupant can be suitably supported.

Moreover, preferably, a length of the inner plate of the support member in a height direction is longer than a length of the connection portion in the height direction. In the configuration as described above, an area of the connection portion is relatively smaller than the inner plate so that a contact area of the inner plate and the seated occupant is enlarged and accordingly local generation of a force applied from the inner plate to the seated occupant can be restrained, and a foreign body sensation caused in the seated occupant by reduction of the rigidity of the support member can be suppressed.

Further, preferably, the inner plate is attached to the side frame by a plurality of inner attachment portions, and the connection portion is formed in such a manner as to overlap with the plurality of inner attachment portions in a seat front to back direction. The connection portion is thus formed in such a manner as to overlap with the plurality of inner attachment portions in the seat front to back direction, so that the rigidity of the support member in the seat front to back direction can be improved, and the seated occupant can be suitably supported particularly during normal operation in which a load from the seated occupant to the support member from a seat front side is applied.

Moreover, preferably, the support member is formed in such a manner that an upper portion of a space partially enclosed by the inner plate, the outer plate, and the connection portion is open. The support member is thus formed in such a manner that an upper portion of a space partially enclosed by the inner plate, the outer plate, and the connection portion is open, so that a state of attachment of the support member to the side frame is easily confirmed, and a maintenance performance becomes favorable.

Further, an airbag and an inflator for the airbag may be disposed at a seat width direction outer side of the outer plate of the support member, and the inflator may be disposed below the inner plate. The inflator is thus disposed below the inner plate so that the inflator allows reduction of an amount of flexure of the support member to be restrained.

With the vehicle seat according to an embodiment of the present disclosure, an amount of protrusion of the support member from the seat back frame in the seat width direction is restrained, enlargement of the seat in the width direction is restrained, and the seated occupant can be suitably protected against impact from the seat width direction. Moreover, with the vehicle seat according to an embodiment of the present disclosure, during normal operation, a support rigidity against a load applied from the seated occupant can be improved and the seated occupant can be suitably supported. Moreover, with the vehicle seat according to an embodiment of the present disclosure, sides of the chest region of the seated occupant that require protection during a side collision can be suitably supported. Moreover, with the vehicle seat according to an embodiment of the present disclosure, inhibition of deformation of the inner plate due to pressing from the seated occupant by the front expansion portion can be suppressed, deformation of the support member toward the seat width direction outer side can be secured, and a load applied to the seated occupant during a side collision is reduced, whereby the seated occupant can be suitably supported. Moreover, with the vehicle seat according to an embodiment of the present disclosure, local generation of a force applied from the inner plate to the seated occupant can be restrained, and a foreign body sensation caused in the seated occupant can be suppressed. Moreover, with the vehicle seat according to an embodiment of the present disclosure, the seated occupant can be suitably supported during normal operation in which a load from the seated occupant to the support member from a seat front side is applied. Moreover, with the vehicle seat according to an embodiment of the present disclosure, a state of attachment of the support member to the side frame can be confirmed through an open portion, whereby a maintenance performance can be favorable. Moreover, with the vehicle seat according to an embodiment of the present disclosure, inhibition of flexure of the support member by abutment of the inner plate against the inflator can be avoided.

DETAILED DESCRIPTION

Hereinafter, a vehicle seat S according to various embodiments of the present disclosure is described. Note that, in the following description, a front to back direction denotes a front to back direction as seen from a seated occupant seated in a vehicle seat, a width direction denotes a width direction (horizontal width direction) of a seat back of the vehicle seat, and a height direction denotes a direction of the height of the seat back, and more precisely an up to down direction of the seat back as the seat back is seen from the front.

Figure 2:
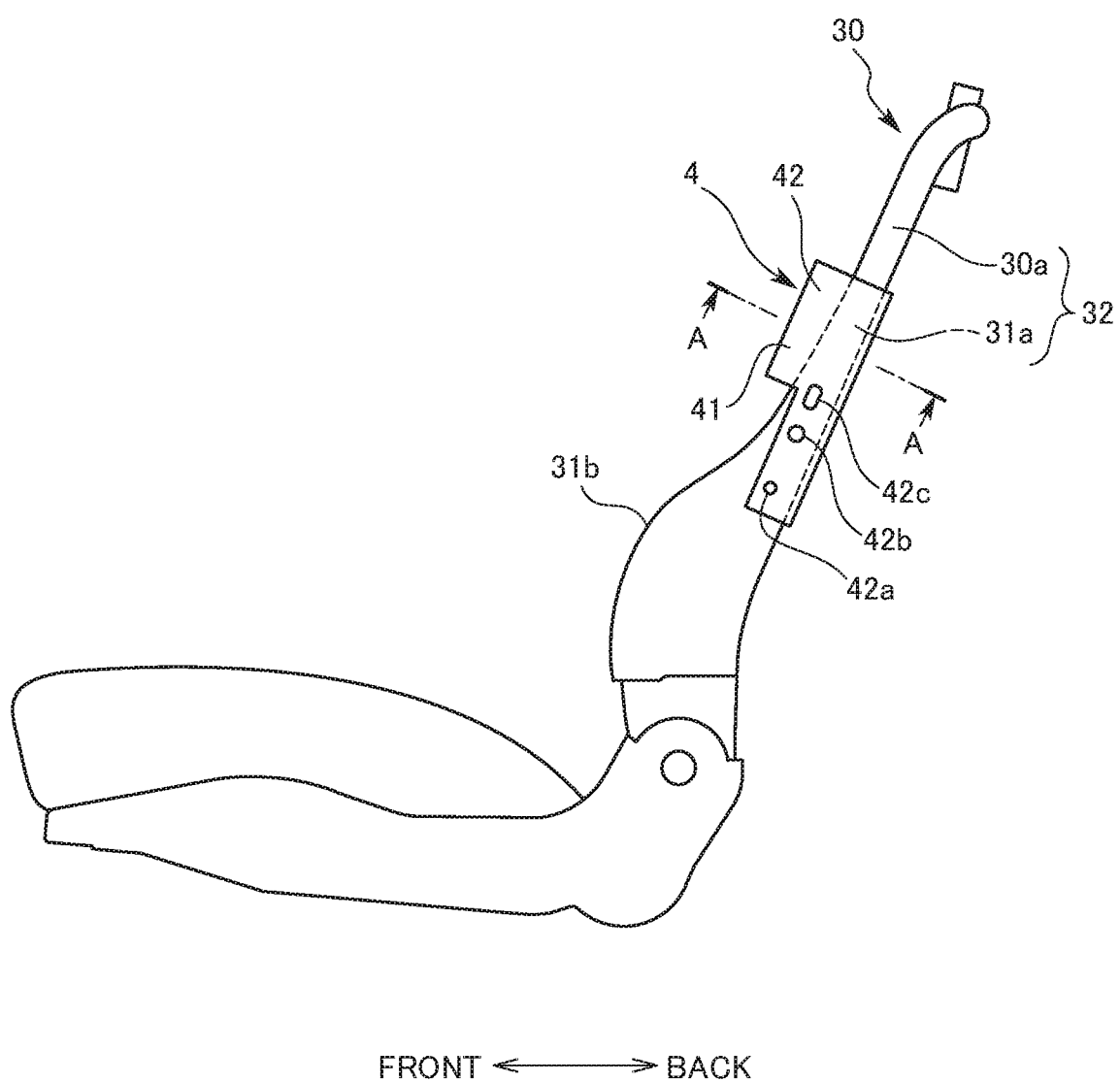
FIG. 2 is a side view of the vehicle seat of FIG. 1, schematically illustrating a seat back frame to which a support member is attached, according to an embodiment.
Figure 3:
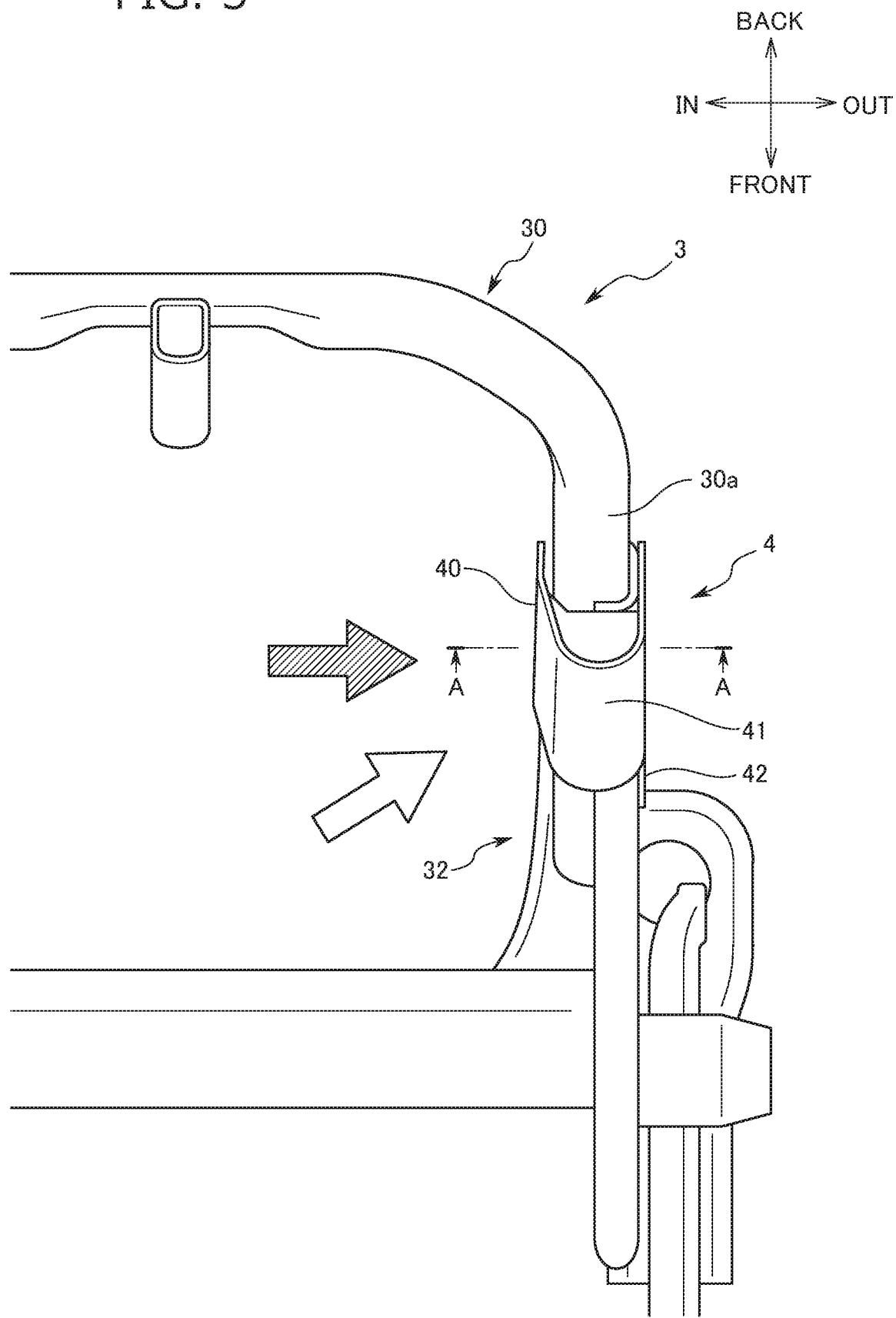
FIG. 3 is a partial, plan view of the seat back frame, according to an embodiment.

First, a configuration of the vehicle seat S according to an embodiment of the present disclosure is described with reference to FIGS. 1-3. Herein, FIG. 1 is a perspective, external view of the vehicle seat S according to an embodiment of the present disclosure, FIG. 2 is a side view schematically illustrating a seat back frame 3 to which a support member 4 is attached, and FIG. 3 is a plan view of the seat back frame 3.

Figure 1:
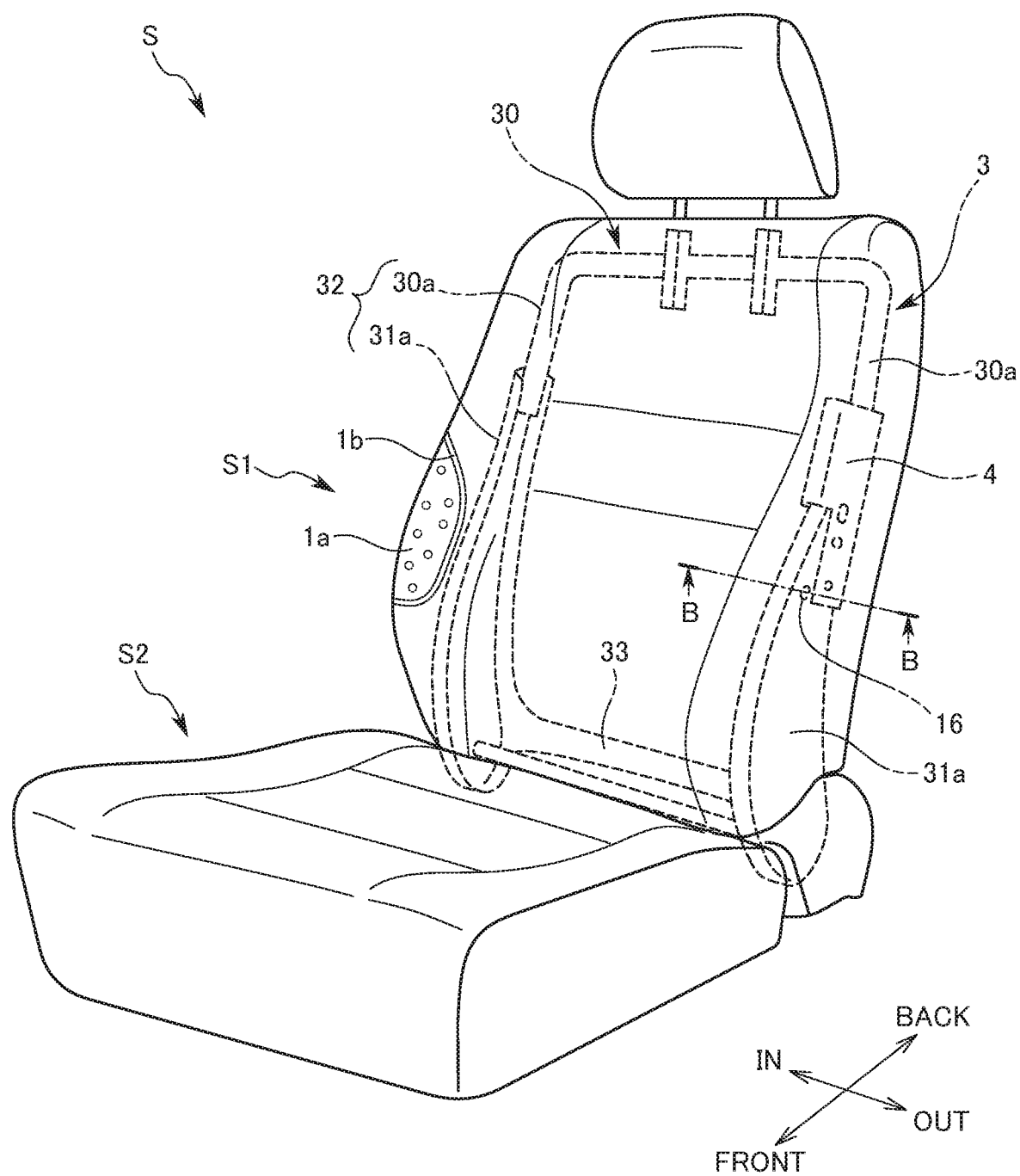
FIG. 1 is an external, perspective view of a vehicle seat according to an embodiment of the present disclosure.

As illustrated in FIG. 1, the vehicle seat S includes a seat back S1 serving as a backrest for a seated occupant and a seat cushion S2 on which the seated occupant is seated.

The seat back S1 is mainly made of the seat back frame 3 serving as a framework, the support member 4 attached to this seat back frame 3, a cushion pad 1a provided in such a manner as to cover these, and a surface skin 1b covering the cushion pad 1a.

The seat back frame 3 is made, into a frame shape, of a side frame 32 disposed to be separated in the width direction of the seat back frame 3 and extending in an up to down direction, a pipe-shaped upper frame 30 partially constituting the side frame 32, disposed at an upper portion of the seat back frame 3, and extending in a seat width direction, and a lower frame 33 connecting lower end portions.

The side frame 32 is made of a side portion 30a of the upper frame 30 that extends in a seat height direction and a side frame body 31a formed in such a manner as to partially cover the side portion 30a on the right and left. The side frame body 31a is formed by press-working a piece of sheet metal to have a substantially C-shaped cross section, and is a plate body formed to be curved such that a front to back width is greater at a lower side than at an upper side. Moreover, the side frame body 31a is provided to the seat back S1 such that an open side is disposed at a seat inner side.

The support member 4 is provided to support the seated occupant in the seat width direction against an external force applied to a vehicle and made of an elastomer resin, such as thermo polyolefin (TPO), thermoplastic polyurethane (TPU), or the like. The support member 4 is attached on at least one side of the right and left side frames 32, and, in the present embodiment, is attached on a side of the seat in a vicinity of a door of the vehicle. Moreover, as illustrated in FIGS. 2 and 3, the support member 4 is mainly made of an inner plate 40 fixed to a seat width direction inner side of the side frame 32, an outer plate 42 fixed to a seat width direction outer side of the side frame 32, and a connection plate 41 connecting front sides of the inner plate 40 and the outer plate 42. Note that a detailed shape of the support member 4 is described below.

Functions of the support member 4 are now described with reference to FIGS. 3 and 4. Herein, FIG. 4A is a cross-sectional view illustrating the support member 4 including a portion fixed to the side frame 32 by screws 30b and the side frame 32 during normal operation, as seen from the line A-A of FIG. 2 or FIG. 3, and FIG. 4B is a cross-sectional view illustrating the same and the side frame 32 during a side collision, as seen from the line A-A of FIG. 2 or FIG. 3.

Figure 4A:
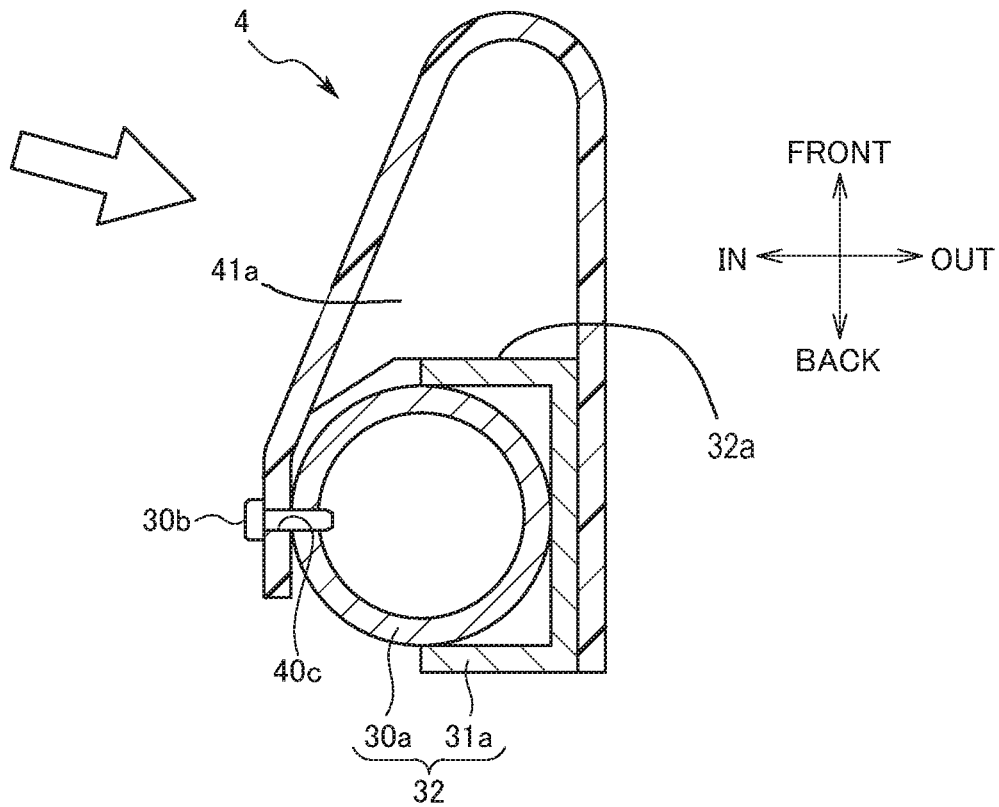
FIG. 4A is a cross-sectional view illustrating a support member including a portion fixed to a side frame by screws and the side frame during normal operation, as seen from the line A-A of FIG. 2 or FIG. 3.
Figure 4B:
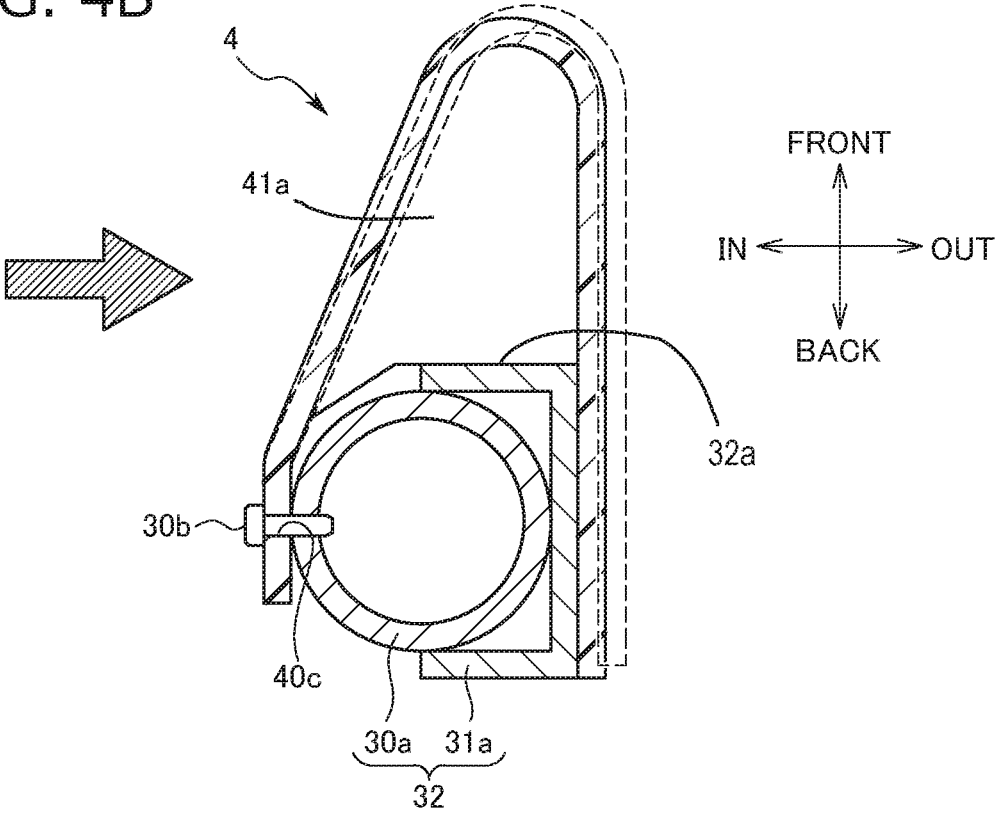
FIG. 4B is a cross-sectional view illustrating the same and the side frame 32 during a side collision, as seen from the line A-A of FIG. 2 or FIG. 3, according to an embodiment.

In a state of normal operation of the vehicle, in a case in which the upper body of the seated occupant rolls in the seat width direction, for example, during travel through a curve, a load is applied from the seated occupant to the support member 4 in a back oblique outward direction as indicated by the outlined arrows in FIGS. 3 and 4A. In this state, the support member 4 allows a reaction force against the load from the seated occupant to be provided by abutment of ribs 41a as described below against a front surface of the side frame 32 and elasticity proper thereto, thereby supporting the seated occupant.

On the other hand, in a state of a side collision of the vehicle, an instantaneous load from sideward of the vehicle is applied to the vehicle, which causes the upper body of the seated occupant to roll in the seat width direction to a great extent in comparison with the normal operation state. In this case, the upper body of the seated occupant greatly rolls so that a large load is applied from the seated occupant to the support member 4 in the seat width direction indicated by the hatched arrows in FIGS. 3 and 4B. During this side collision, as the support member 4 is indicated by the broken line in FIG. 4B, the support member 4 is deformed to allow the seated occupant to move in the seat width direction, whereby application of a large reaction force from the support member 4 to the seated occupant is restrained.

Figure 5:
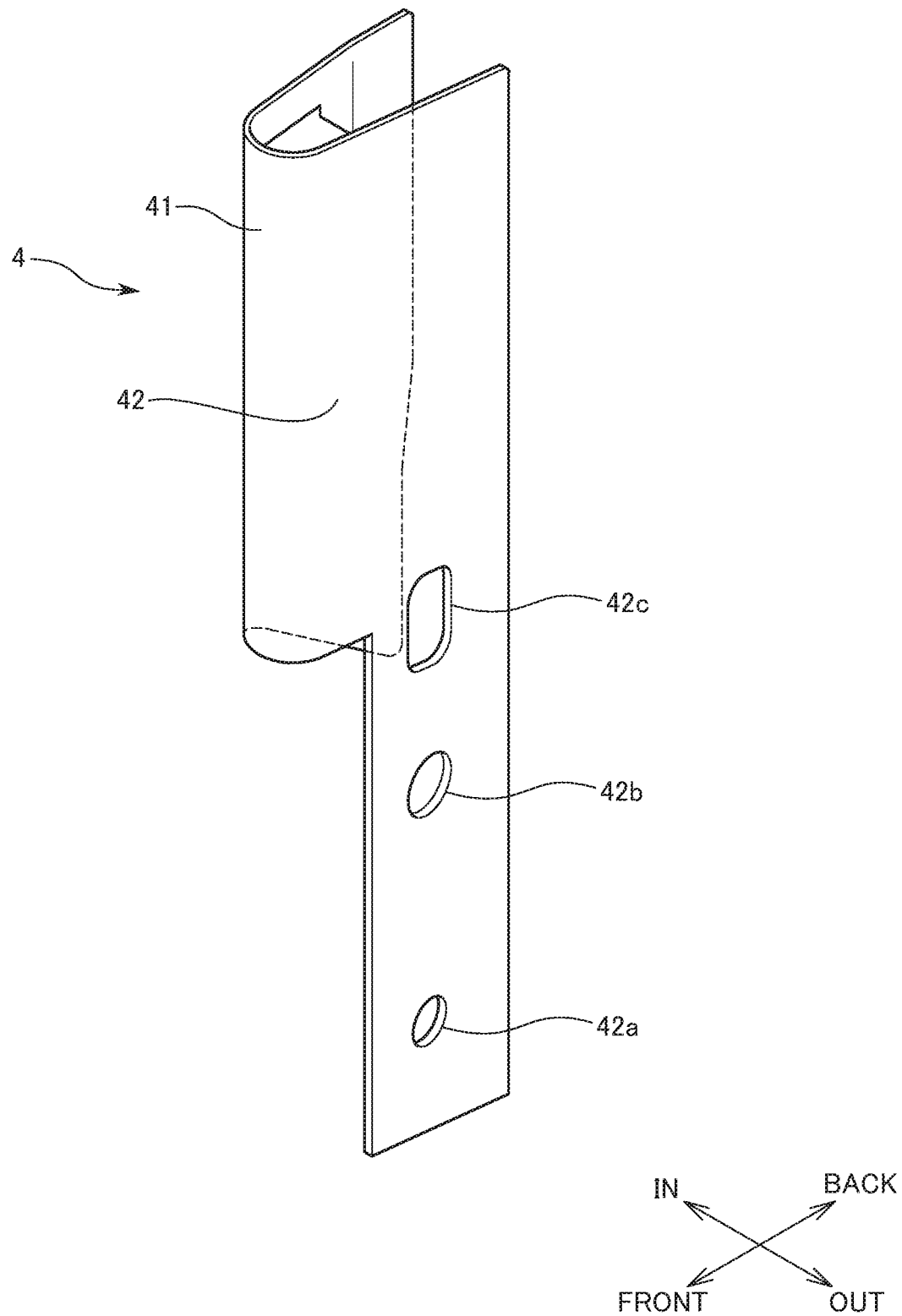
FIG. 5 is a perspective view of an outer plate side of the support member, according to an embodiment.
Figure 6:
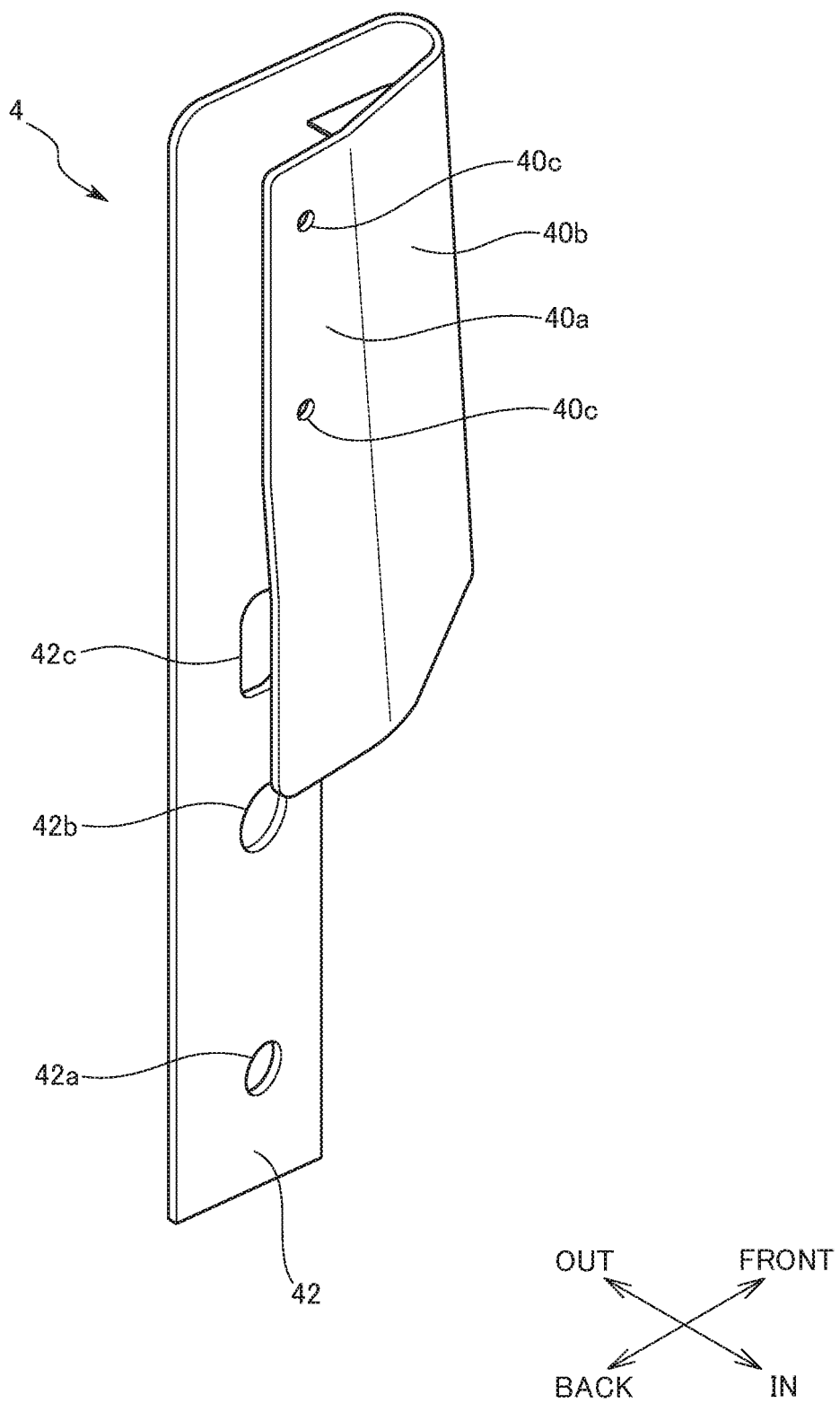
FIG. 6 is a perspective view of an inner plate side of the support member, according to an embodiment.
Figure 7:
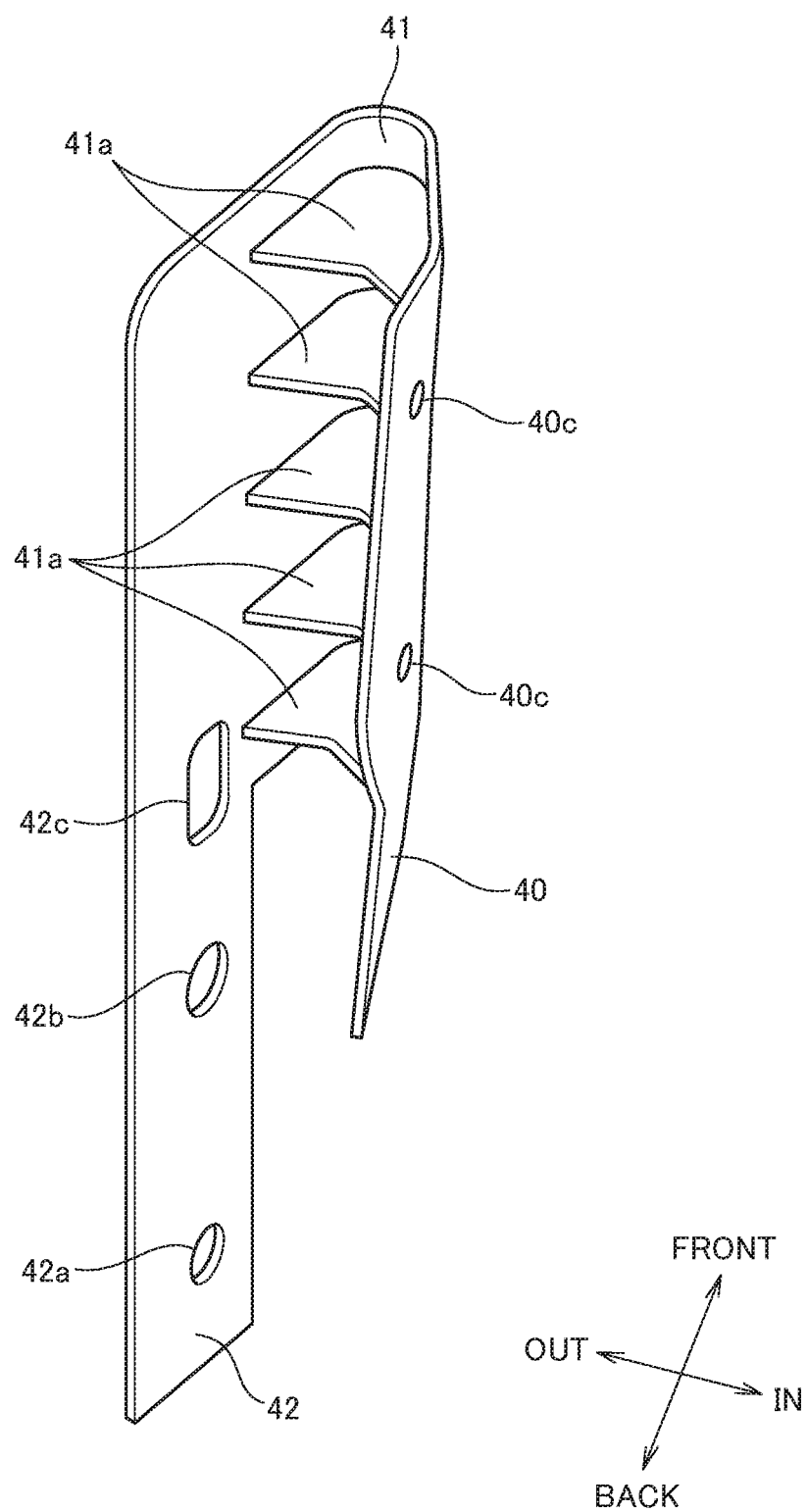
FIG. 7 is a perspective view of a back side of the support member, according to an embodiment.

The detailed shape of the support member 4 and functions thereof that allow the effects as described above to be produced is now described with reference to FIGS. 5-7. Herein, FIG. 5 is a perspective view of an outer plate side of the support member 4, FIG. 6 is a perspective view of an inner plate side of the support member 4, and FIG. 7 is a perspective view of a back side of the support member 4.

As described above, the support member 4 is mainly made of the inner plate 40, the outer plate 42, and the connection plate 41 connecting the front side of each of the inner plate 40 and the outer plate 42. The inner plate 40 is made of a rectangular portion 40a extending in the up to down direction and a trapezoidal portion 40b that extends continuously from the rectangular portion 40a in the seat width direction and is connected to the connection plate 41. In particular, the inner plate 40 is attached to the side portion 30a of the upper frame 30 at a height of the chest region of the seated occupant above a front expansion portion 31b of the side frame 32. Note that the height of the chest region of the seated occupant is determined based on a height of the chest region of a dummy in accordance with SAE standard.

Thus, the inner plate 40 is attached to the side portion 30a of the upper frame 30 at the height of the chest region of the seated occupant, so that the ribs of the seated occupant beside the chest portion can be properly protected by being supported by the inner plate 40. Further, the inner plate 40 is disposed above the front expansion portion 31b, so that, when the seated occupant hits the inner plate 40 during a side collision, the front expansion portion 31b fails to interfere with deformation of the inner plate 40, whereby deformation of the support member 4 is allowed.

The rectangular portion 40a is a portion fixed to the side portion 30a of the upper frame 30 constituting the side frame 32. The support member 4 is thus fixed to the side portion 30a by the screws 30b inserted into inner side attachment holes 40c as described below. In a state in which the rectangular portion 40a is attached to the side frame 32, an outer surface of the rectangular portion 40a that is opposed to an outer plate 42 as described below abuts against a side surface side of the side portion 30a of the upper frame 30 constituting the side frame 32. The rectangular portion 40a has, at portions abutting against the side portion 30a of the upper frame 30 in the seat width direction, the two inner attachment holes 40c penetrated in a thickness direction, in a vertical manner. Note that, since an upper portion of the support member 4, which is an upper portion of a space partially enclosed by the inner plate 40, the outer plate 42, and the connection plate 41, is open as illustrated in FIG. 7, a state of attachment of the upper frame 30 to the side portion 30a by the screws 30b is easily visually confirmed, so that a maintenance performance is favorable.

In the trapezoidal portion 40b, a long-side side is formed in such a manner as to be continuous from the rectangular portion 40a and a short-side side is connected to the connection plate 41 described below. An upper side of the trapezoidal portion 40b is formed in such a manner as to be continuous from an upper side of the inner plate 40 at a substantially identical height, and a lower side of the trapezoidal portion 40b is formed to slant upward from a connection portion of a lower side of the inner plate 40.

The connection plate 41, which corresponds to a connection portion, is formed to have a substantially U-shaped cross section and extend in the height direction, and is formed to be continuous between the trapezoidal portion 40b of the inner plate 40 and the outer plate 42 described below. A length of the connection plate 41 in the height direction is configured in such a manner as to overlap, in a seat front to back direction, with the two inner attachment holes 40c formed in the rectangular portion 40a. The connection plate 41 is thus formed so that, during normal operation, a rigidity of the connection plate 41 against a load applied from the seated occupant to the connection plate 41 from a seat front and the seat inner side to a seat back and a seat outer side can be improved and an ability to hold the seated occupant can be improved. The inner plate 40 is formed such that a length thereof in the height direction is long in comparison with the length of the connection plate 41 in the height direction. The support member 4 is thus formed so that a contact area of the inner plate 40 and the seated occupant is enlarged and local generation of a force applied from the inner plate 40 to the seated occupant can be restrained. Further, an area of the connection plate 41 is configured to be relatively smaller than the inner plate 40 and the rigidity thereof is reduced so that, when the seated occupant is in contact with the support member 4 through the surface skin 1b and the cushion pad 1a, a foreign body sensation caused in the seated occupant can be suppressed. Note that the connection plate 41 preferably has a substantially U-shaped cross section that allows a stress concentration to be avoided, to which, however, the present disclosure is not limited. For example, the connection plate 41 may be shaped into a flat plate extending in an up to down manner.

The outer plate 42 is formed to be substantially parallel to the rectangular portion 40a of the inner plate 40, has a length in the seat front to back direction longer than the inner plate 40, and extends downward longer than the inner plate 40. In the outer plate 42, in an order from below, an outer attachment hole 42a for attaching the outer plate 42 to the side frame 32, a module attachment hole 42b for attaching an airbag module 6, and a bead relief hole 42c formed to prevent interference of a welded bead formed on the side frame 32 are formed.

Figure 12:
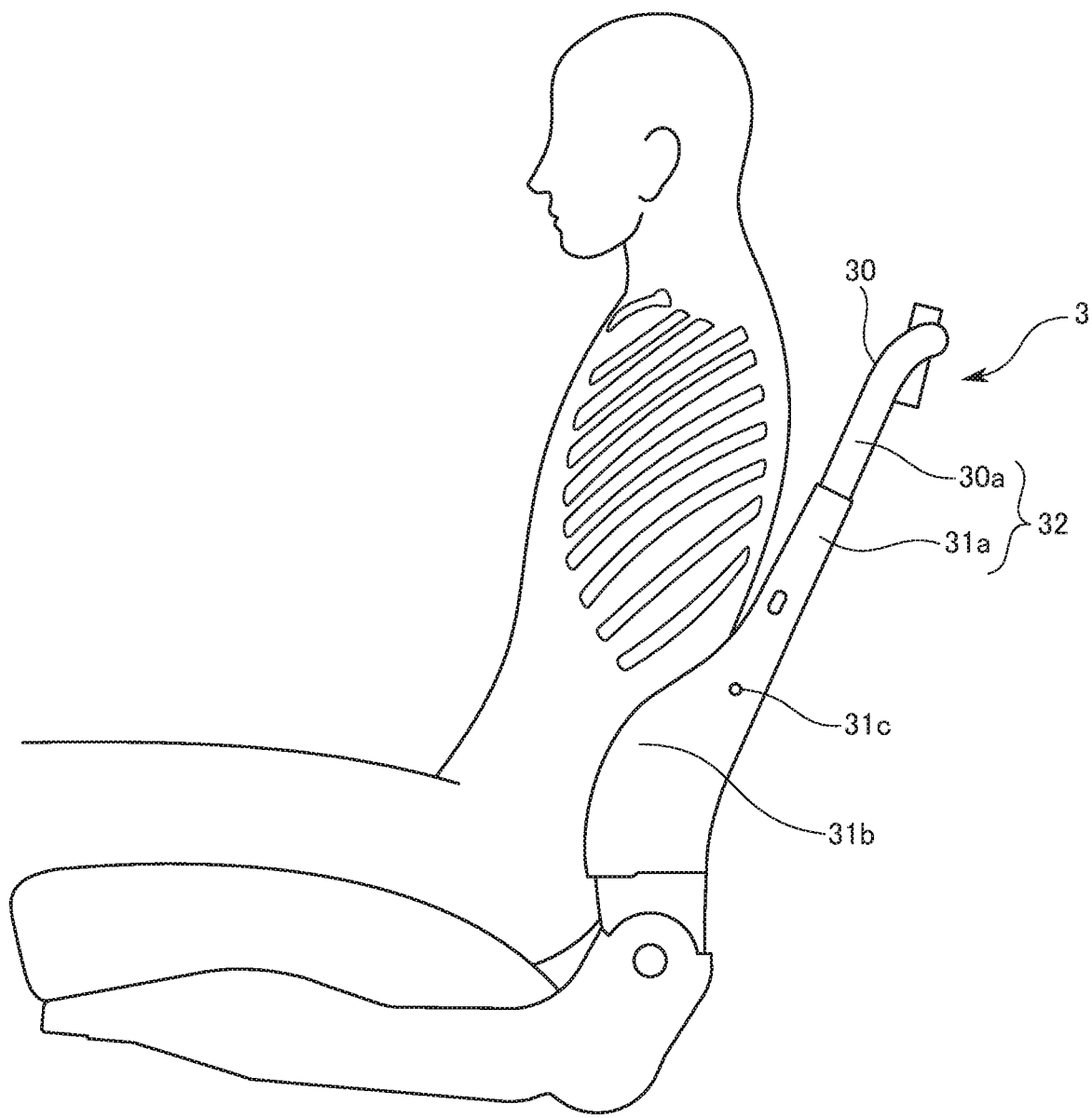
FIG. 12 is a side view illustrating the side frame including a front expansion portion, according to an embodiment.

The outer attachment hole 42a is configured to attach the side frame body 31a to the outer plate 42 by, together with a through hole 31c formed in the side frame body 31a as illustrated in FIG. 12, being inserted with a bolt (not shown) that is fastened by a nut (not shown). The outer attachment hole 42a is formed at a position that does not overlap in the seat width direction with a forming position of the inner attachment hole 40c. Specifically, the inner attachment hole 40c is formed at an upper portion of the support member 4 and the outer attachment hole 42a is formed at a lower portion of the support member 4 so as not to overlap in the seat width direction.

The outer attachment hole 42a and the inner attachment hole 40c are thus formed so that positions of attachment to the side frame 32, by fastenings each inserted thereto, do not overlap in the seat width direction. Accordingly, a rigidity against a load applied from the seated occupant to the support member 4 in the seat width direction during a side collision can be reduced, and, as described with reference to FIG. 4B, the support member 4 is deformed to allow the seated occupant to move in the seat width direction, whereby application of a large reaction force from the support member 4 to the seated occupant is restrained. Further, as described above, the support member 4 is attached over the seat width direction inner side and the seat width direction outer side of the side frame 32 by the inner plate 40 and the outer plate 42. Accordingly, the support member 4 is disposed more compactly than one that is attached only to an outer side of the side frame 32 using a space in the seat width direction.

The bead relief hole 42c is formed to avoid interference of the support member 4 with the welded bead rising from the side frame body 31a outward in the seat width direction. The specific welded bead is produced, for example, by welding a fixing portion for fixing a cushion spring (not shown) or the like forming a portion of the seat back frame 3 to the side frame body 31a. Moreover, details of the module attachment hole 42b is described below.

Moreover, as illustrated in FIG. 7, five of the plate-shaped ribs 41a in the present embodiment that correspond to a rear side connection portion are formed on a back side of the connection plate 41 that faces the side frame 32. The ribs 41a connect an outer side of the inner plate 40 and an inner side of the outer plate 42 and are formed vertically to each of the connection plate 41, the inner plate 40, and the outer plate 42. The ribs 41a abut against a front side of the side portion 30a of the upper frame 30, which can generate a reaction force against a backward load of a load applied from the seated occupant toward a back of the seat and outward in the seat width direction during normal operation as indicated by the outlined arrows in FIGS. 3 and 4A and enhance the ability to hold the seated occupant.

The vehicle seat S including the support member 4 according to the embodiment as described above allows the ability to hold the seated occupant during normal operation to be improved and allows a large reaction force from the support member 4 against the seated occupant to be prevented by allowing the seated occupant to move during a side collision. In other words, the vehicle seat S according to the present embodiment allows the ability to hold the seated occupant during normal operation in which an airbag does not operate to be improved and impact during a side collision to be reduced even in a vehicle without an airbag.

Figure 8:
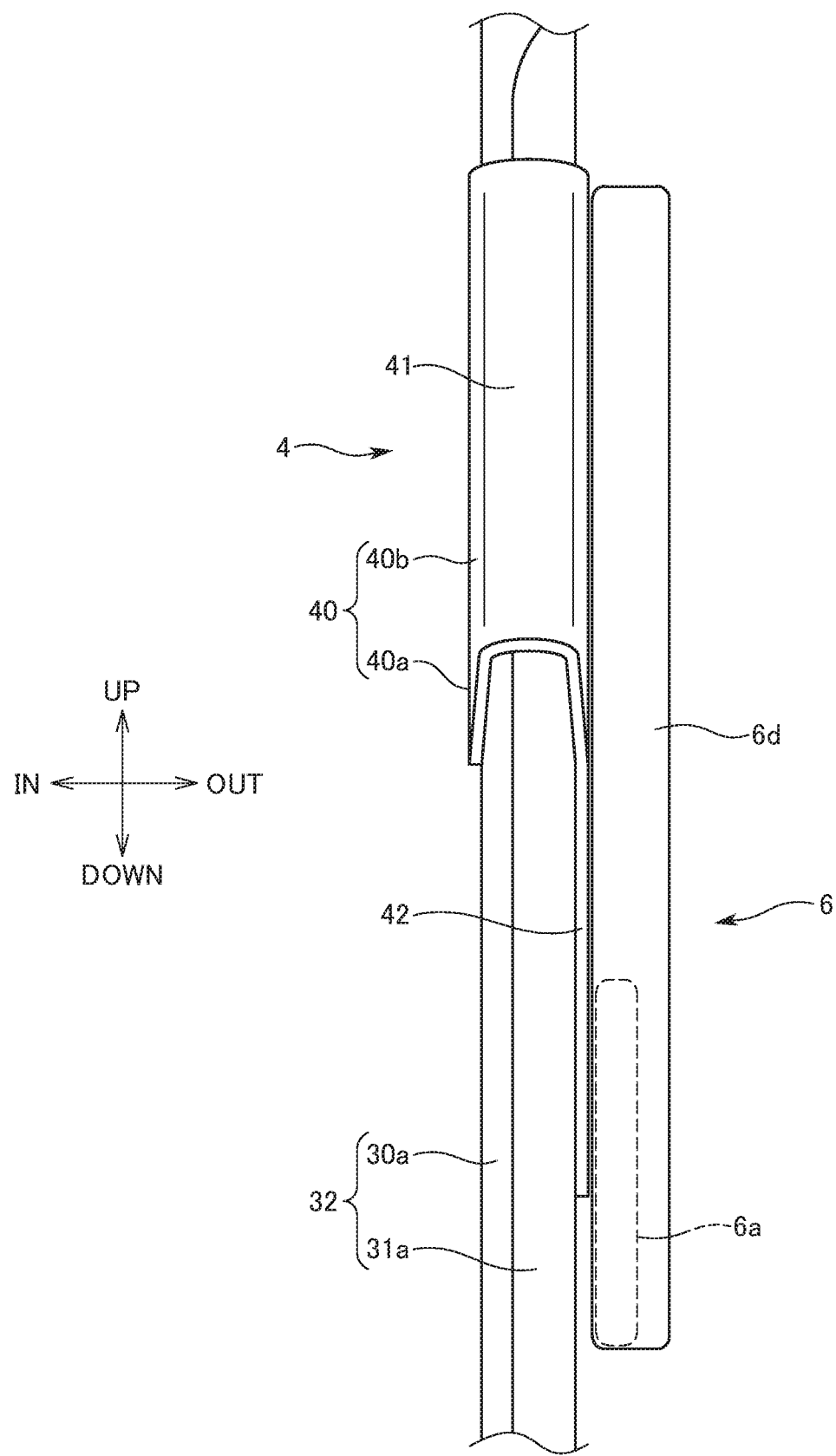
FIG. 8 is a front view schematically illustrating the support member and an airbag module that are attached to the side frame, according to an embodiment.
Figure 9:
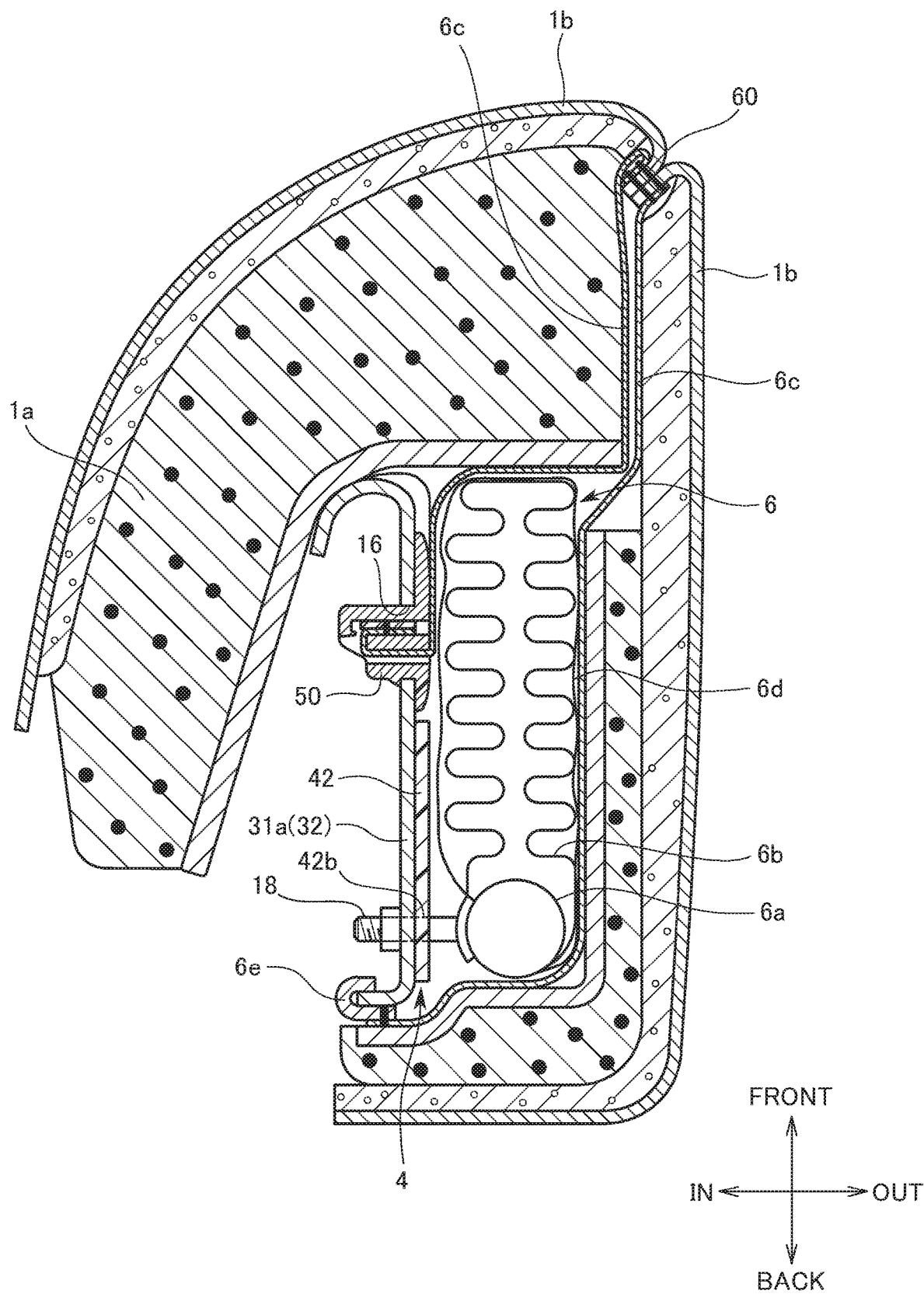
FIG. 9 is a cross-sectional view illustrating the support member and the airbag module that are attached to an outer side of the side frame of the seat back frame, as seen from the line B-B of FIG. 1, according to an embodiment.

Further, to protect the seated occupant against impact during a side collision, the airbag module 6 may be attached to a seat width direction outer side of the support member 4. An embodiment in which the airbag module 6 is thus provided is now described with reference to FIGS. 8 and 9. Herein, FIG. 8 is a front view schematically illustrating the support member 4 and the airbag module 6 that are attached to the side frame 32, and FIG. 9 is a cross-sectional view illustrating the support member 4 and the airbag module 6 that are attached to the outer side of the side frame 32 of the seat back frame 3, as seen from the line B-B of FIG. 1.

The airbag module 6 according to the present embodiment is made of a caseless airbag module that does not include a module case. As illustrated in FIG. 9, the airbag module 6 includes an inflator 6a, a folded airbag 6b, and a wrap member 6d wrapping the airbag 6b. The airbag module 6 is fixed, together with the inflator 6a described below, to the support member 4 and the side frame 32 by a bolt 18 provided to stand toward a vehicle seat S inner side that is inserted into the module attachment hole 42b and fastened. In other words, the module attachment hole 42b formed in the support member 4 is formed to fix the airbag module 6.

Moreover, the airbag module 6 is covered by two webbings 6c, one end of which is sewn together to a seam portion 60 of an end portion of the surface skin 1b. The other end of one webbing 6c is attached to an attachment hole 16 of the side frame body 31a by an attachment member 50, and the other end of the other webbing 6c is engaged with a back side edge of the side frame body 31a by an engagement hook 6e. Then, a break of the seam portion 60, to which the two webbings 6c are sewn together, due to a pressure of a gas blown from the inflator 6a, enables the airbag 6b to expand toward a front of the vehicle seat S.

The airbag 6b is held by the wrap member 6d made of a cloth bag or the like while folded, and this wrap member 6d is configured to be easily broken when the airbag 6b expands. The inflator 6a is disposed below the inner plate 40 inside the airbag 6b, and the airbag 6b is configured to expand toward the front of the vehicle seat S by a gas blown from the inflator 6a. The inflator 6a is thus disposed below the inner plate 40 so that interference with deformation of the inner plate 40 due to abutment of the seated occupant during a side collision can be avoided. As described above, an outer peripheral portion of the inflator 6a is fixed to the support member 4 and the side frame 32 by the bolt 18 provided to stand toward the vehicle seat S inner side. Note that the inflator 6a may be fixed to the side frame 32 by an attachment member other than the bolt.

As illustrated in FIG. 9, the support member 4 is attached to the side frame body 31a such that the outer plate 42 is disposed at a back of the attachment member 50. The support member 4 is thus attached to the side frame body 31a so that interference of the support member 4 with attachment of the airbag module 6 to the side frame body 31a can be prevented.

As described with illustration in FIG. 4, the support member 4 according to the embodiments as described above is fixed in the seat width direction to the side portion 30a of the upper frame 30 by the screws 30b inserted into the inner side attachment holes 40c. However, the present disclosure is not limited to the embodiments as described above, and a support member 7 fixed in the seat front to back direction to the side portion 30a of the upper frame 30 is included as well.

Figure 10:
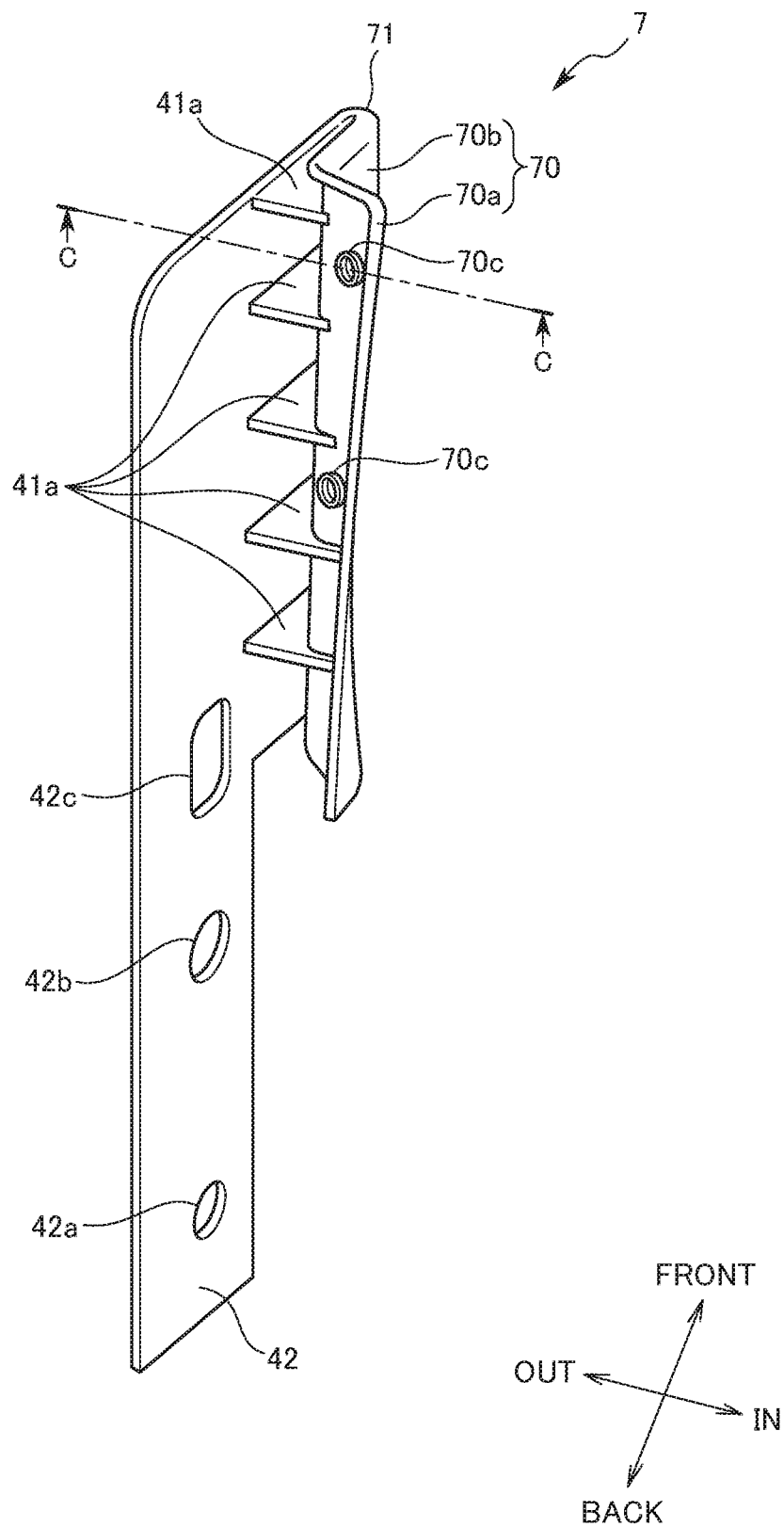
FIG. 10 is a perspective view of the back side of a support member according to another embodiment.
Figure 11:
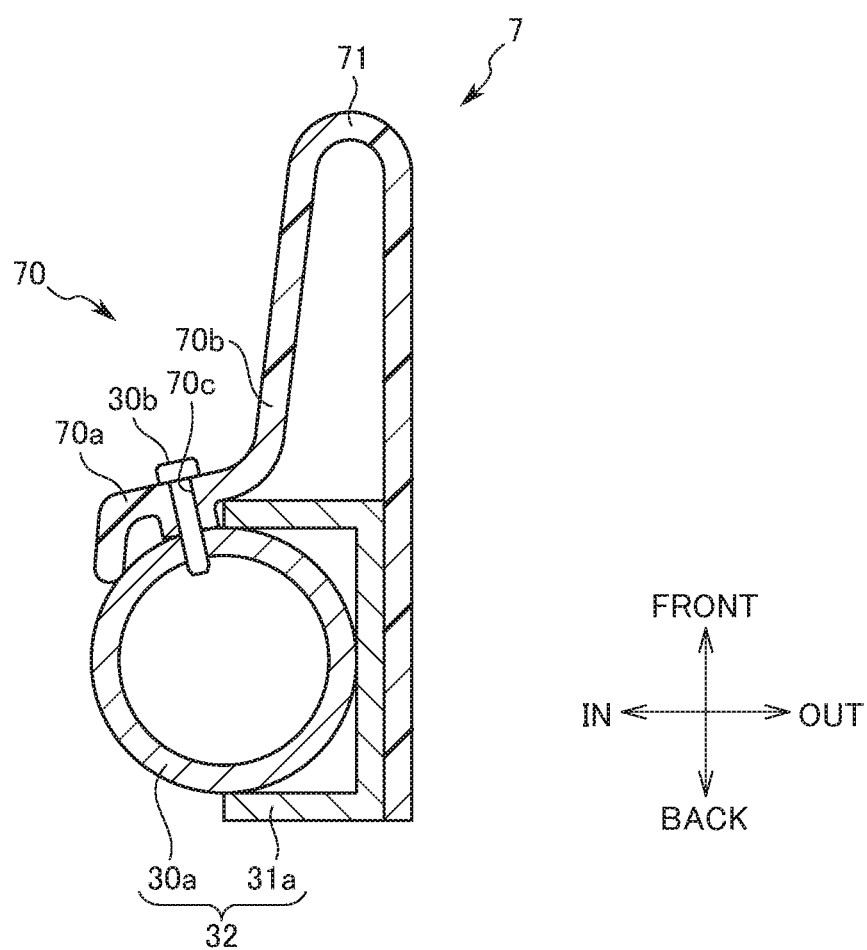
FIG. 11 is a perspective cross-sectional view illustrating the support member according to another embodiment including the portion fixed to the side frame by the screws and the side frame, taken along C-C of FIG. 10.

The support member 7 according to another embodiment is described with reference to FIGS. 10 and 11. Note that the same components as those of the embodiments as described above are provided with the same reference signs and the description thereof is omitted, but the description on points different from the embodiments as described above is made in detail. Herein, FIG. 10 is a perspective view of the back side of the support member 7, and FIG. 11 is a perspective cross-sectional view illustrating the support member 7 including the portion fixed to the side frame 32 by the screws 30b and the side frame 32, taken along C-C of FIG. 10.

The support member 7 is mainly made of an inner plate 70 fixed to the seat width direction inner side of the side frame 32, the outer plate 42 fixed to the seat width direction outer side of the side frame 32, and a connection portion 71 connecting front sides of the inner plate 70 and the outer plate 42.

The inner plate 70 extends in the up to down direction and includes a rectangular side reception portion 70b and a flange portion 70a formed at an end portion side of the inner plate 70 to be continuous from the side reception portion 70b and formed with an angle of approximately 90° to 120° relative to the side reception portion 70b.

The flange portion 70a is a portion fixed to the side portion 30a of the upper frame 30 forming the side frame 32. In the flange portion 70a, inner attachment holes 70c described below are formed. The screws 30b are inserted into these inner attachment holes 70c, whereby the support member 7 including the flange portion 70a is fixed to the side portion 30a. In a state in which the flange portion 70a is attached to the side frame 32, an inner surface of the flange portion 70a abuts against a front surface side of the side portion 30a of the upper frame 30 forming the side frame 32.

The flange portion 70a has, at portions abutting against the side portion 30a of the upper frame 30 in the seat width direction, the two inner attachment holes 70c extending in a thickness direction that is a front to back direction, in a vertical manner. Peripheral edges of a rear side of the inner attachment holes 70c that is a side portion 30a side of the flange portion 70a are formed to rise toward the side portion 30a. The peripheral edges of the inner attachment holes 70c are thus formed to rise so that, as illustrated in FIG. 11, the side frame body 31a partially covering the side portion 30a can prevent the flange portion 70a from separating from the side portion 30a. Accordingly, shaking of the screws 30b can be suppressed by the peripheral edges of the inner attachment holes 70c, and fixation thereof is stabilized.

The side reception portion 70b is a portion that receives a load by the seated occupant in the seat width direction, and is formed to be continuous from the connection portion 71 described below on a side opposite to a side continuous from the flange portion 70a.

The connection portion 71 is formed into a curved shape to have a substantially U-shaped cross section and extends in the height direction, and is formed to be continuous from the side reception portion 70b of the inner plate 70 and the outer plate 42. A length of the connection portion 71 in the height direction is configured in such a manner as to overlap with the two inner attachment holes 70c formed in the flange portion 70a in the seat front to back direction.

In particular, the connection portion 71 is formed to have a large curvature in comparison with the connection plate 41 so that a distance between opposing surfaces of the side reception portion 70b and the outer plate 42 is short. The connection portion 71 is thus formed so that the side reception portion 70b is disposed closer to a seat outer side than the side frame body 31a. Accordingly, an amount of protrusion of the flange portion 70a bending and extending toward the seat inner side from the side reception portion 70b to the seat inner side is restrained, and the flange portion 70a is disposed at a position opposed to the front surface side of the side portion 30a fixed to the side frame body 31a. The flange portion 70a is thus disposed, which allows the flange portion 70a to be fixed to the side portion 30a by the screws 30b in the front to back direction.

Thus, the flange portion 70a can be fixed to the side portion 30a by the screws 30b not in the seat width direction but in the seat front to back direction, which prevents head portions of the screws 30b from widely extending on a plane orthogonal to the seat width direction, and, in the seat width direction, a feeling of bodily discomfort of the seated occupant due to a contact to the support member 7 through the cushion pad 1a and the surface skin 1b can be restrained. Moreover, for example, various components may be attached between the upper frame 30 in a pair on the right and left in the vehicle seat S, a space of which is accordingly restricted, and an operation performance of attaching these components and the like may be lowered. In this regard, the support member 7 having a shape as illustrated in FIG. 11 can be attached to the side portion 30a of the upper frame 30 by the screws 30b in the seat front to back direction, which allows a space of a seat width direction inner side of the support member 7 to be enlarged in comparison with the support member 4. Accordingly, an operation performance of attaching the above components and the support member 7 is improved in comparison with the support member 4 attached to the side portion 30a in the seat width direction. Further, an axial direction of the screws 30b does not extend in the seat width direction so that application of a repeated load to screw portions of the screws 30b in the axial direction can be suppressed, and the lifetime of the screws 30b and further the lifetime of the support member 7 can be extended.

In the present embodiments, the vehicle seat according to the present disclosure has been mainly described. However, the embodiments as described above are merely illustrative to facilitate understanding of the present disclosure and are not intended to limit the present disclosure. It shall be apparent that the present disclosure may be modified or improved without departing from the scope thereof, and that the present disclosure includes equivalents thereof.

For example, in the present embodiments, a configuration in which the support member is attached only to one side frame of the side frames on the right and left has been described, but, to enhance the ability to hold the seated occupant on both sides of the seat, the support member formed bilaterally symmetrically may be attached bilaterally to the side frames.

Moreover, in the present embodiments, the airbag module attached to the support member that is configured to be caseless has been described, which is, however, not limitative, and may include a module case.

TABLE OF REFERENCE NUMERALS

1a: cushion pad
1b: surface skin
16: attachment hole
18: bolt
3: seat back frame
30: upper frame
30a: side portion
30b: screw
31a: side frame body
31b: front expansion portion
31c: through hole
32: side frame
32a: front surface of side frame
33: lower frame
4: support member
40: inner plate
40a: rectangular portion
40b: trapezoidal portion
40c: inner attachment hole (inner attachment portion)
41: connection plate (connection portion)
41a: rib (rear side connection portion)
42: outer plate
42a: outer attachment hole (outer attachment portion)
42b: module attachment hole (airbag attachment portion)
42c: bead relief hole
50: attachment member
6: airbag module.
6a: inflator
6b: airbag
6c: webbing
6d: wrap member
6e: engagement hook
60: seam portion
7: support member
70: inner plate
70a: flange portion.
70b: side reception portion
70c: inner attachment hole (inner attachment portion)
71: connection portion
S: vehicle seat
S1: seat back
S2: seat cushion

What is claimed is:

1. A vehicle seat comprising:
a support member that is attached to a side frame of a seat back frame and supports a seated occupant from a side of the seated occupant;
wherein:
the support member comprises
an inner plate that is screwed to an inner side of the side frame in a seat width direction,
an outer plate that is disposed at an outer side of the side frame in the seat width direction, and
a connection portion that connects a front side of the inner plate and a front side of the outer plate in a seat front to back direction;
the support member is formed so that an upper portion of a space partially enclosed by the inner plate, the outer plate, and the connection portion is open; and
the support member comprises a rear side connection portion that is connected to the inner plate, the outer plate, and the connection portion at a side of the connection portion that faces the side frame.

2. The vehicle seat according to claim 1, wherein the rear side connection portion is formed to abut against a front surface of the side frame in the seat front to back direction when a load is applied to the inner plate.

3. The vehicle seat according to claim 1, wherein a length of the inner plate of the support member in a height direction is longer than a length of the connection portion in the height direction.

4. The vehicle seat according to claim 1, wherein the inner plate is attached to the side frame by a plurality of inner attachment portions.

5. The vehicle seat according to claim 1, wherein:
an airbag and an inflator for the airbag are disposed at the outer side of the outer plate of the support member in the seat width direction; and
the inflator is disposed below an upper end of the inner plate.

6. The vehicle seat according to claim 1, further comprising:
a cushion pad; and
a surface skin that covers the cushion pad;
wherein:
the cushion pad and the surface skin are arranged in front of the support member to cover the support member from a front side of the support member in the seat front to back direction;
the side frame comprises a front expansion portion that expands forward in the seat front to back direction;
the inner plate is provided above a maximum expansion position of the front expansion portion; and
the rear side connection portion is formed to abut against a front surface of the side frame in the seat front to back direction when a load is applied to the inner plate.

7. The vehicle seat according to claim 1, further comprising:
an airbag module that is attached to an outer side of the support member in the seat width direction;
a surface skin; and
two webbings, an end of each webbing being sewn together to a seam portion of an end portion of the surface skin;
wherein:
the airbag module is covered by the two webbings;
the side frame comprises a front expansion portion that expands forward in the seat front to back direction; and
the inner plate is provided above a maximum expansion position of the front expansion portion.

8. The vehicle seat according to claim 1, further comprising:
an airbag module that is attached to an outer side of the support member in the seat width direction;
a surface skin; and two webbings, an end of each webbing being sewn together to a seam portion of an end portion of the surface skin;

wherein:

the airbag module is covered by the two webbings;

the side frame comprises a front expansion portion that expands forward in the seat front to back direction;

the inner plate is provided above a maximum expansion position of the front expansion portion; and an other end of one of the two webbings is attached to an attachment hole provided in the side frame through an attachment member.

9. The vehicle seat according to claim 1, further comprising:

an airbag module that includes an inflator, a folded airbag, and a wrap member that wraps the airbag, and that is attached to an outer side of the support member in the seat width direction;

a surface skin; and two webbings, an end of each webbing being sewn together to a seam portion of an end portion of the surface skin;

wherein:

the airbag module is covered by the two webbings;

the side frame comprises a front expansion portion that expands forward in the seat front to back direction;

the inner plate is provided above a maximum expansion position of the front expansion portion;

an other end of one of the two webbings is attached to an attachment hole provided in the side frame through an attachment member;

the support member is provided with a module attachment hole configured to be fixed with the airbag module; and the inflator is fixed to the support member and the side frame through a bolt such that the airbag module is fixed to the support member and the side frame, the bolt extends toward an inner side of the seat, is inserted into the module attachment hole, and is fastened.

10. A vehicle seat comprising:

a support member that is attached to a side frame of a seat back frame and supports a seated occupant from a side of the seated occupant;

wherein:

the support member comprises:

an inner plate that is screwed to an inner side of the side frame in a seat width direction;

an outer plate that is disposed at an outer side of the side frame in the seat width direction; and a connection portion that connects a front side of the inner plate and a front side of the outer plate in a seat front to back direction;

the side frame comprises a front expansion portion that expands forward in the seat front to back direction;

the inner plate is provided above a maximum expansion position of the front expansion portion;

the support member comprises a rear side connection portion that is connected to the inner plate, the outer plate, and the connection portion at a side of the connection portion that faces the side frame; and an inner end of the rear side connection portion in the seat width direction extends inward as the inner end extends rearward.

11. The vehicle seat according to claim 10, further comprising:

a cushion pad; and a surface skin that covers the cushion pad;

wherein:

the cushion pad and the surface skin are arranged in front of the support member to cover the support member from a front side of the support member in the seat front to back direction; and the rear side connection portion is formed to abut against a front surface of the side frame in the seat front to back direction when a load is applied to the inner plate.

12. The vehicle seat according to claim 10, further comprising:

an airbag module that is attached to an outer side of the support member in the seat width direction;

a surface skin; and two webbings, an end of each webbing being sewn together to a seam portion of an end portion of the surface skin;

wherein:

the airbag module is covered by the two webbings.

13. The vehicle seat according to claim 10, further comprising:

an airbag module that is attached to an outer side of the support member in the seat width direction;

a surface skin; and two webbings, an end of each webbing being sewn together to a seam portion of an end portion of the surface skin;

wherein:

the airbag module is covered by the two webbings; and an other end of one of the two webbings is attached to an attachment hole provided in the side frame through an attachment member.

14. The vehicle seat according to claim 10, wherein:

the inner plate comprises an inner attachment portion through which the inner plate is attached to the side frame; and the rear side connection portion is arranged at a position that does not overlap with the inner attachment portion in the seat width direction.

15. A vehicle seat comprising:

a support member that is attached to a side frame of a seat back frame and supports a seated occupant from a side of the seated occupant;

wherein:

the support member comprises an inner plate that is screwed to an inner side of the side frame in a seat width direction, an outer plate that is disposed at an outer side of the side frame in the seat width direction, and a connection portion that connects a front side of the inner plate and a front side of the outer plate in a seat front to back direction;

the support member is formed so that an upper portion of a space partially enclosed by the inner plate, the outer plate, and the connection portion is open;

a width of a front end portion of the connection portion in the seat width direction is smaller than a width of the side frame in the seat width direction;

the support member comprises a rear side connection portion that is connected to the inner plate, the outer plate, and the connection portion at a side of the connection portion that faces the side frame; and a width of the rear side connection portion in the seat width direction becomes larger from a connection portion side toward a side frame side in the rear side connection portion.

16. The vehicle seat according to claim 15, further comprising:

a cushion pad; and a surface skin that covers the cushion pad;
wherein:
the cushion pad and the surface skin are arranged in front of the support member to cover the support member from a front side of the support member in the seat front to back direction;
and
the rear side connection portion is formed to abut against a front surface of the side frame in the seat front to back direction when a load is applied to the inner plate.

17. The vehicle seat according to claim 15, wherein:
an inner end of the rear side connection portion in the seat width direction extends inward as the inner end extends rearward.

18. The vehicle seat according to claim 15, wherein:
an airbag and an inflator for the airbag are disposed at the outer side of the outer plate of the support member in the seat width direction; and
the inflator is disposed below an upper end of the inner plate.

* * * * *